(12) United States Patent
Kaaja et al.

(10) Patent No.: US 7,738,846 B2
(45) Date of Patent: Jun. 15, 2010

(54) SHARED SCANNING IN DISTRIBUTED NETWORKS

(75) Inventors: Harald Kaaja, Jarvenpaa (FI); Juha Salokannel, Tampere (FI); Janne Tervonen, Espoo (FI)

(73) Assignee: Nokia Corporation, Espoo (FI)

( * ) Notice: Subject to any disclaimer, the term of this patent is extended or adjusted under 35 U.S.C. 154(b) by 972 days.

(21) Appl. No.: 11/506,211

(22) Filed: Aug. 17, 2006

(65) Prior Publication Data

US 2008/0045210 A1 Feb. 21, 2008

(51) Int. Cl.
*H04B 1/18* (2006.01)
(52) U.S. Cl. .................................. 455/161.1; 370/338
(58) Field of Classification Search .................. None
See application file for complete search history.

(56) References Cited

U.S. PATENT DOCUMENTS

| 2003/0013472 A1* | 1/2003 | Miklos et al. | 455/517 |
| 2006/0089138 A1* | 4/2006 | Smith et al. | 455/426.1 |
| 2006/0215622 A1* | 9/2006 | Abdel-Kader et al. | 370/338 |
| 2007/0263558 A1* | 11/2007 | Salomone | 370/318 |

FOREIGN PATENT DOCUMENTS

| WO | 0239665 A2 | 5/2002 |
| WO | 2005088913 A1 | 9/2005 |
| WO | 2008020285 A2 | 2/2008 |
| WO | 2008020285 A3 | 2/2008 |

OTHER PUBLICATIONS

"Distributed Medium Access Control (MAC) for Wireless Networks", Version 1.0, (Dec. 8, 2005), pp. 1-176.
"Wimedia Networking Protocol", Draft 0.85, (Jul. 28, 2006), pp. 1-76.
Zhang, Z. et al., "Performance of neighbor discovery alogrithms in mobile ad hoc self-configuring networks with directional antennas", Military Communications Conference, IEEE, vol. 5, (Oct. 17-20, 2005),3162-3168.
International Search Report and Written Opinion for PCT/IB2007/002310 dated Mar. 4, 2008.

\* cited by examiner

*Primary Examiner*—Ajit Patel
(74) *Attorney, Agent, or Firm*—Brake Hughes Bellermann LLP

(57) ABSTRACT

Various embodiments are described relating to sharing scanning operations among nodes in a wireless network, such as a WiMedia ultra-wideband (UWB) network. In an example embodiment, a message may be sent from a first node to one or more other nodes in a wireless network indicating that the first node is configured to perform a scanning operation on a wireless medium in substitution of scanning the wireless medium at the one or more other nodes. The wireless medium may be scanned, for example, by the first node to obtain scanning results for the one or more other nodes. The scanning results may be sent, for example, by the first node, to the one or more other nodes.

33 Claims, 12 Drawing Sheets

| Octets: 1 | 1 | 1 | 1 |
|---|---|---|---|
| Element ID | Length | Scanning frequency | Counter to next/ from previous scan |

| Octets: 1 | 1 | 1 | 1 | 1 |
|---|---|---|---|---|
| Element ID | Length | Scanning frequency | Counter to next/ from previous scan | Scanning zone information |

| Octets: 1-n | 1 | 1 | 1 |
|---|---|---|---|
| Command frame ID (Scanning Request) | Length | Scanning frequency | Counter to next/ from previous scan |

| Octets: 1-n | 1 | 1 | 1 | 1 |
|---|---|---|---|---|
| Command frame ID (Scanning Response) | Length | Result | Scanning frequency | Counter to next/ from previous scan |

| Octets: 1-n | 1 | 1 | 1 |
|---|---|---|---|
| Command frame ID (Scanning Indication) | Length | Scanning frequency | Counter to next/ from previous scan |

| Octets: 1 | 1 | 2 | 1 |
|---|---|---|---|
| Element ID | Length | Alien BPST (in microseconds) | Age of the report (in superframes) |

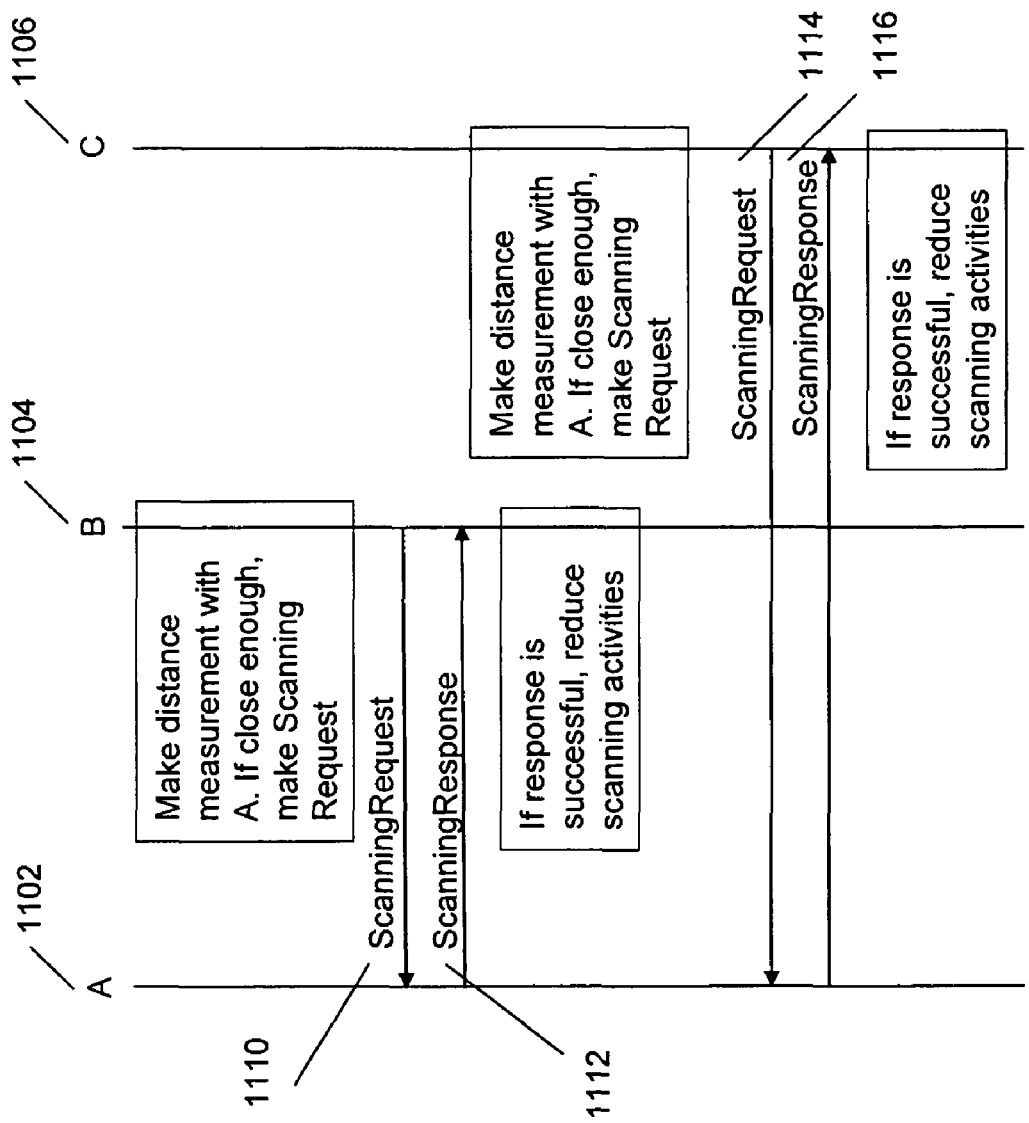

SHARED SCANNING IN DISTRIBUTED NETWORKS

BACKGROUND

As wireless technology has advanced, a variety of wireless networks have been installed, such as cellular and other wireless networks. Some wireless networks are based upon the Institute of Electrical and Electronics Engineers (IEEE) 802.11 family of Wireless LAN (WLAN) industry specifications, for example. As another example, some wireless networks are based upon the Distributed Medium Access Control (MAC) for Wireless Networks industry specifications of the WiMedia Alliance, for example. For example, the WiMedia network protocol adaptation (WiNet) layer is a protocol adaptation layer (PAL) that builds on a WiMedia ultra-wideband (UWB) common radio platform to augment the convergence platform with TCP/IP services. A number of working groups are working to improve on this technology.

An example standard, for example, the Distributed Medium Access Control (MAC) for Wireless Networks of the WiMedia Alliance, defines a distributed medium access control (MAC) sublayer for wireless networks, and further specifies a wireless network structure that does not require an existing infrastructure for communication such as, for example, a WiMedia ultra-wideband (UWB) network.

Categories of example applications considered for such an example standard may include portable electronic devices intended to be carried by a user, home electronics equipment, and personal computers and peripherals. Example portable electronic devices may have specific requirements to support mobility and good power efficiency. Devices such as home electronics and computers may not be as mobile, and not as sensitive to power efficiency as such portable electronic devices. All of these devices may benefit from a zero-infrastructure environment.

An interval, for example, a periodic time interval may be used to coordinate frame transmissions between devices, for example, a superframe interval may be used which includes a beacon period followed by a data period. The beacon period may include multiple beacon slots which may be used by multiple devices to send beacons.

In an example network formed with fully distributed medium access coordination, logical groups may be formed around each device in the network to facilitate contention-free frame exchanges while exploring medium reuse over different spatial regions. These logical groups may include, for example, a beacon group and an extended beacon group, both of which may be determined with respect to an individual device. For example, a beacon group may include a set of devices from which a device receives beacons that identify the same beacon period start time (BPST) as the device. An extended beacon group may include a union of a device's beacon group and the beacon groups of all devices in the device's beacon group.

Example MAC protocol algorithms may attempt to ensure that no member of an extended beacon group transmits a beacon frame at the same time as the device. Information included in beacon frames may facilitate contention-free frame exchanges by ensuring that a device does not transmit frames while a neighbor of the device (e.g., another device in the device's beacon group) is transmitting or receiving frames.

When a device is enabled, it may scan one or more channels for beacons and select a communications channel. If no beacons are detected in the selected channel, the device may create its own beacon period (BP) by sending a beacon. If one or more beacons are detected in the selected channel, the device may synchronize its BP to existing beacons in the selected channel. The device may then exchange data with members of its beacon group using the same channel the device selected for beacons.

Each device may protect its and its neighbors' BPs for exclusive use of the beacon protocol. Thus, no transmissions other than beacons may be attempted during the BP of any device. A device may protect an alien BP, detected by reception of a beacon frame unaligned with the device's own BP, by announcing a reservation covering the alien BP in its beacon. Within the context of a particular beacon group, an alien beacon group may include one or more devices included in a beacon group that identify a beacon period start time (BPST) that is different from the particular beacon group.

An example WiMedia standard also defines a dynamic beaconing technique, which enables devices in a distributed network to maintain fast connectivity. Devices may maintain synchronization with each other by participating in a beacon period, for example, by each device sending its own beacon and listening to other devices' beacons once in each superframe (e.g., 65.536 ms). The rest of the time the devices may send data to each other or hibernate, or sleep.

If a group of devices moves into the range of another group of devices, the groups may need to synchronize to each other before connectivity from one group to another may be available for the devices, and before channel time reservations may be handled without collisions. A group of devices may thus be viewed as "one device" or "two or more devices participating in the same beacon group," for example, devices having the same beacon period start time (BPST).

Establishing synchronization between the groups may involve regular scanning activities. Scanning may be performed at a device by listening to the channel, for example, for at least the time associated with one superframe occasionally. The scanning may be repeated based on an expectation of the connectivity speed. For example, if one superframe time is scanned once every second, the new devices or groups of devices on the same communications channel may be found on average in half a second when they enter the operating range. Scanning may also be subdivided into shorter pieces, but the amount of the total scanning time may be significant for finding the new devices within the range.

The power consumption caused by regular scanning may be significant, especially for a battery-powered device. For example, a device may participate in a beacon period (e.g., for an activity time of 0.5 ms for a small number of devices in the beacon group) every superframe and may perform a superframe scan once every two seconds, for example, with no data exchange. The power consumption attributed to the scanning for this example is four times the power consumption attributed to the beaconing. Also, if the device hibernates, participating in only a small part of the beacon periods, the scanning may still be required, but the scanning operation may consume an even higher percentage of the whole power consumption of the device.

SUMMARY

Various embodiments are described relating to sharing scanning operations among nodes in a wireless network.

According to an example embodiment, a message may be sent from a first node to one or more other nodes in a wireless network indicating that the first node is configured to perform a scanning operation on a wireless medium in substitution of scanning the wireless medium at the one or more other nodes. According to an example embodiment, the wireless medium may be scanned to obtain scanning results for the one or more other nodes, and the scanning results may be sent to the one or more other nodes.

In an example embodiment, a message may be received from a first node at a second node in a wireless network indicating that the first node is configured to perform a scanning operation on a wireless medium in substitution of scanning the wireless medium at the second node. According to an example embodiment, an activity of scanning the wireless medium at the second node may be substantially reduced, and scanning results of the scanning operation may be received from the first node.

In another example embodiment, an apparatus for wireless communications may include a controller, a memory coupled to the controller, and a wireless transceiver coupled to the controller. The apparatus may be adapted to send a message via the wireless transceiver to indicate that the apparatus is configured to perform a scanning operation on a wireless medium in substitution of scanning the wireless medium at any of one or more devices receiving the message. According to an example embodiment, the apparatus may be further adapted to scan the wireless medium to obtain scanning results for the any of one or more devices; and send the scanning results to the any of one or more devices.

In another example embodiment, an apparatus for wireless communications may include a controller, a memory coupled to the controller, and a wireless transceiver coupled to the controller. The apparatus may be adapted to receive a message via the wireless transceiver indicating that a device transmitting the message is configured to perform a scanning operation on a wireless medium in substitution of scanning the wireless medium by the apparatus. According to an example embodiment, the apparatus may be further adapted to substantially reduce an activity of scanning the wireless medium at the apparatus, and to receive scanning results of the scanning operation from the device.

In another example embodiment, a computer program product for wireless communications may be tangibly embodied on a computer-readable medium and may include executable code that, when executed, may be configured to cause one or more processors to send a message from a first node to one or more other nodes in a wireless network indicating that the first node is configured to perform a scanning operation on a wireless medium in substitution of scanning the wireless medium at the one or more other nodes. According to an example embodiment, the executable code, when executed, may be configured to cause the one or more processors to scan the wireless medium to obtain scanning results for the one or more other nodes; and send the scanning results to the one or more other nodes.

In another example embodiment, a computer program product for wireless communications may be tangibly embodied on a computer-readable medium and may include executable code that, when executed, may be configured to cause one or more processors to receive a message from a first node at a second node in a wireless network indicating that the first node is configured to perform a scanning operation on a wireless medium in substitution of scanning the wireless medium at the second node. According to an example embodiment, the executable code, when executed, may be configured to cause the one or more processors to substantially reduce an activity of scanning the wireless medium at the second node, and to receive scanning results of the scanning operation from the first node.

BRIEF DESCRIPTION OF THE DRAWINGS

FIG. 5 is an example format of a scanning information element included in an example beacon according to an example embodiment.

FIG. 6 is an example format of a scanning information element included in an example beacon for sharing scanning between nodes according to an example embodiment.

FIG. 7 is an example format of a scanning request message according to an example embodiment.

FIG. 8 is an example format of a scanning response message according to an example embodiment.

FIG. 9 is an example format of a scanning indication message according to an example embodiment.

FIG. 10 is an example format of a scanning result information element included in an example beacon according to an example embodiment.

FIG. 11c is a timing diagram illustrating an example transmission of scanning request and scanning response messages according to an example embodiment.

DETAILED DESCRIPTION

Figure 1A:
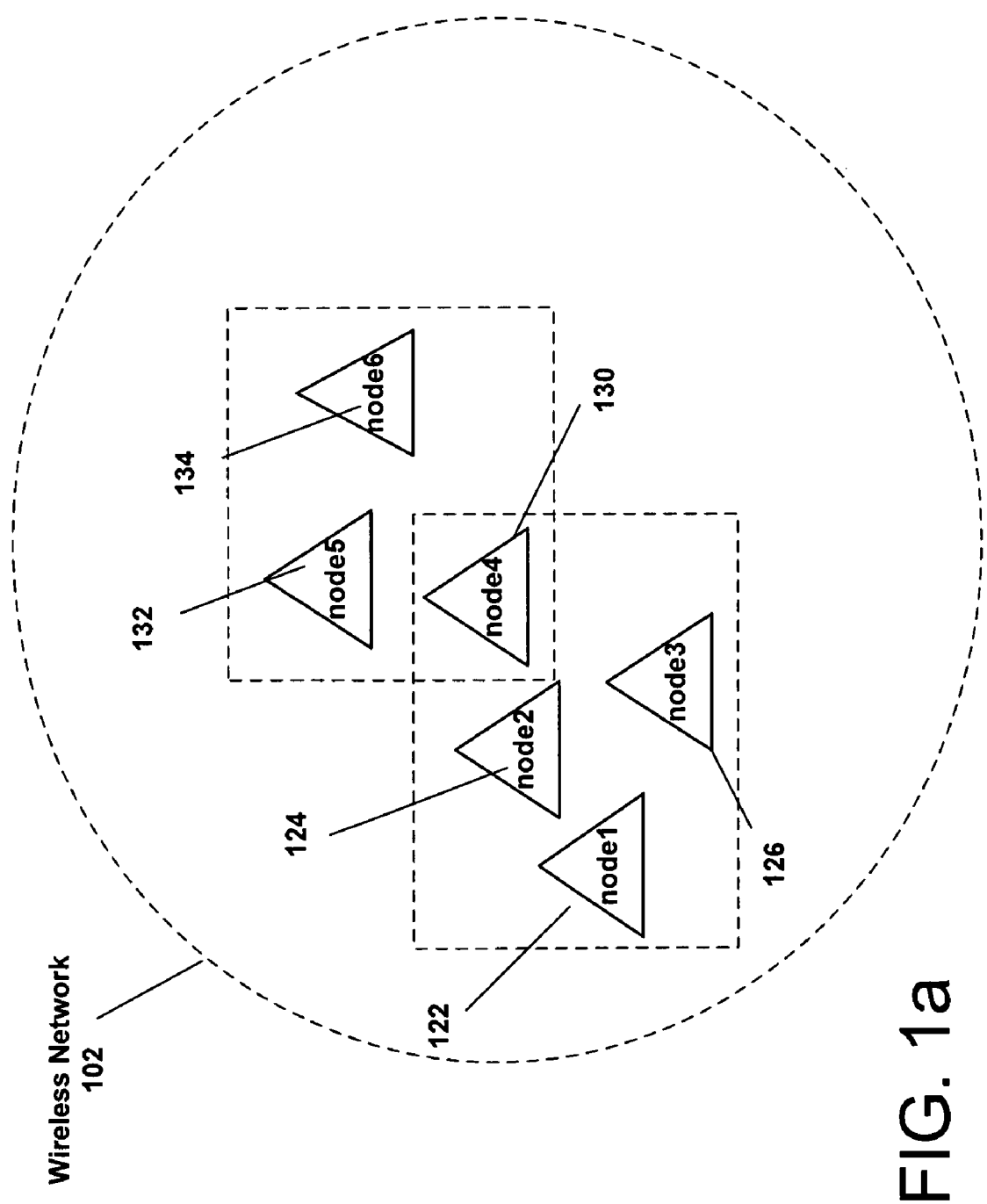
FIGS. 1a-1b are diagrams of example configurations of beacon groups of a wireless network according to an example embodiment.
Figure 1B:
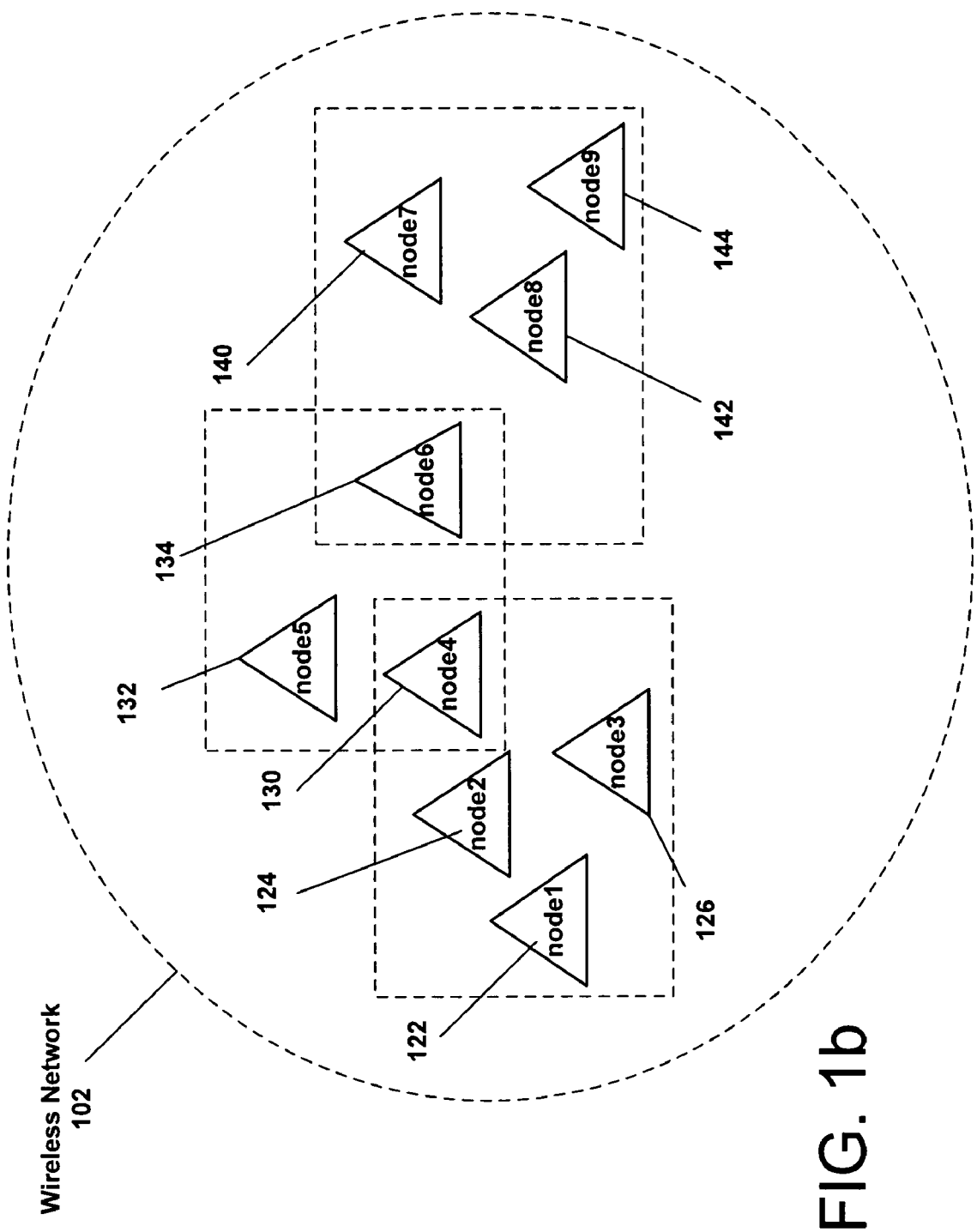

Referring to the Figures in which like numerals indicate like elements, FIGS. 1a-1b are diagrams of example configurations of beacon groups of a wireless network 102 according to an example embodiment. The term "node" or "wireless node" or "network node" or "network station" may refer, for example, to a wireless station, e.g., a subscriber station or mobile station, an access point or base station, a relay station or other intermediate wireless node, or other wireless computing devices, such as laptop computers, desktop computers, and peripheral devices, as examples.

As shown in FIG. 1a, a wireless network node node1 122 is in range of, and thus may receive messages from, nodes node2 124, node3 126, and node4 130. Moreover, a node5 132 and node6 134 are also in range of, and may receive messages from, the node4 130. Further, each of node2 124, node3 126, and node4 130 are in range of each other, and may receive messages from among themselves. Thus, for example, node1 122, node2 124, node3 126, and node4 130 may be included in a common beacon group. However, node1 122 and node node5 132, as shown in FIG. 1a, are not in range of each other, and thus may not receive messages from each other directly. Thus, for example, the node node4 130 may send messages to, or receive messages from, any of the nodes node1 122, node2 124, node3 126, node5 132, and node6 134. Thus, node4 130, node5 132, and node6 134 may also be included in a common beacon group. For example, node4 130, node5 132, and node6 134 may be included in the same beacon group as node1 122, node2 124, node3 126, and node4 130, for example, an extended beacon group. Therefore, if, for example, node4 130 were to perform scanning of the medium, then all of node1 122, node2 124, node3 126, node5 132, and node6 134 may be able to reduce their scanning operations on the medium and receive the scanning results from the node4 130 in substitution of at least some of their own scanning operations on the medium. Thus, for example, the scanning results received from node4 130 may substitute for the scanning results that each of the other nodes might obtain if they did not reduce their scanning operations.

This example reduction of scanning operations may thus result in a substantial reduction of power consumption by the non-scanning nodes, especially if the node4 130 were powered by, for example, a mains or an AC power source.

As shown in FIG. 1b, the wireless network node node6 134 is in range of, and thus may receive messages from, node7 140, node8 142, and node9 144. However, the nodes node7 140, node8 142, and node9 144 may be included in a different beacon group from the beacon group of node6 134, and thus may be referred to as being part of an alien beacon group. Messages sent by node7 140, node8 142, and node9 144 may interfere with reception and transmission by node6 134, and thus node6 134 may determine the beacon period (BP) and the beacon period start time (BPST) of the alien beacon group, and may reserve a portion of the medium for the transmissions of node7 140, node8 142, and node9 144 in order to avoid collisions.

If, for example, any of nodes node7 140, node8 142, and node9 144 were to move within the operating range of node6 134, then any of the affected nodes may change their beacon group according to WiMedia protocol. One skilled in the art of wireless communications would understand that nodes may change beacon groups for many different reasons.

As discussed below, power consumption caused by scanning a medium of a wireless network may be reduced, for example, by sharing the operations of scanning the medium among the nodes of the network. According to an example embodiment, operations of scanning the medium may be shared among nodes or devices of common beacon groups.

Figure 2:
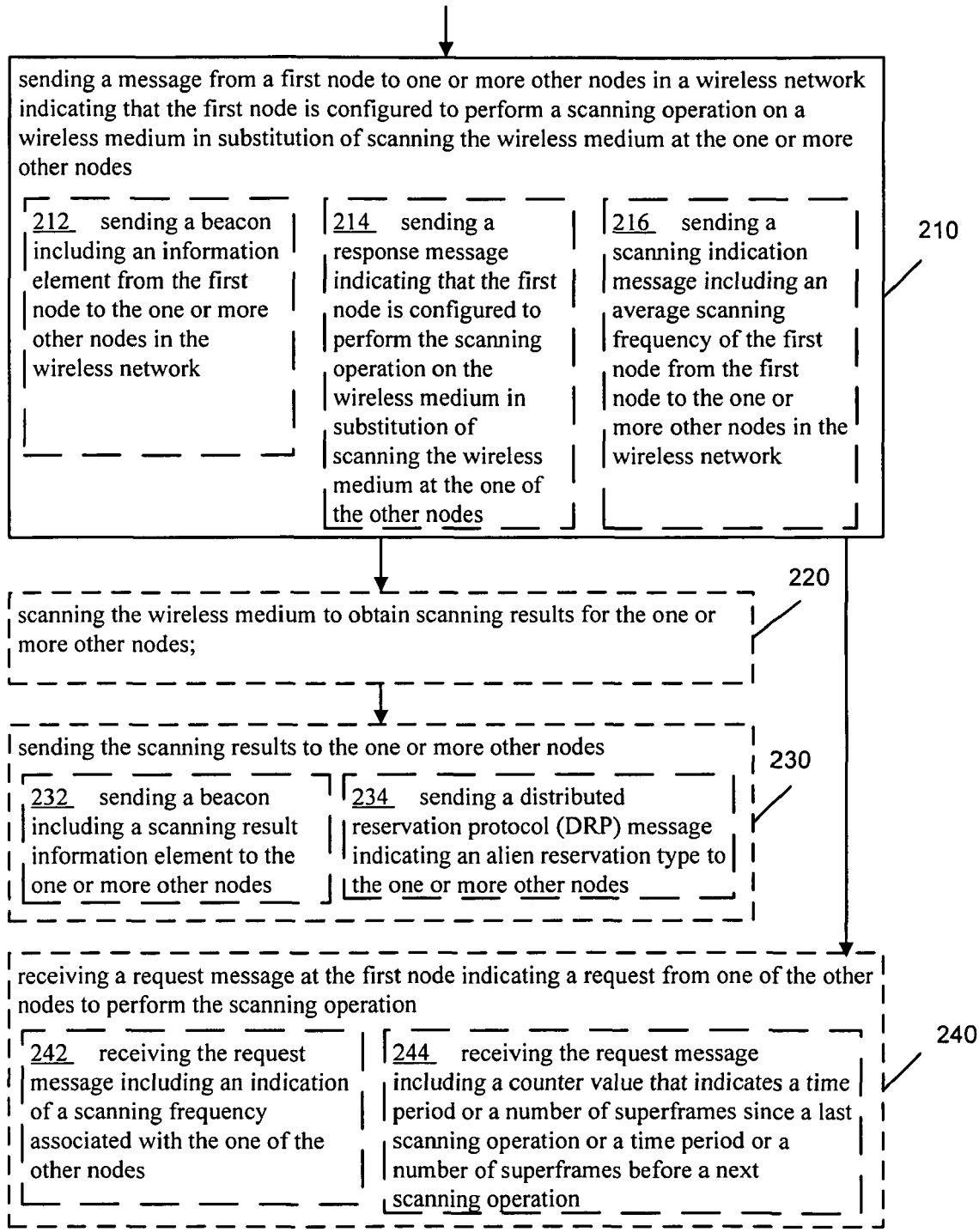
FIG. 2 is a flow chart illustrating operation of determining a node to perform a scanning operation for other nodes of a wireless network according to an example embodiment.

FIG. 2 is a flow chart illustrating operation of determining a first node to perform a scanning operation for other nodes of a wireless network according to an example embodiment. A message may be sent from a first node to one or more other nodes in a wireless network indicating that the first node is configured to perform a scanning operation on a wireless medium in substitution of scanning the wireless medium at the one or more other nodes (210). For example, node4 130 may send a message to node2 124 indicating that node4 130 is configured to perform a scanning operation on the wireless medium in substitution of scanning the wireless medium at node2 124. Thus, the node2 124 may be able, for example, to reduce its scanning activities and rely instead on substitution of the scanning activity of node4 130.

According to an example embodiment, a beacon may be sent including an information element from the first node in the wireless network to the one or more other nodes in the wireless network, the information element indicating that the first node is configured to perform the scanning operation on the wireless medium in substitution of scanning the wireless medium at the one or more other nodes (212). For example, the information element may include a scanning frequency field which may include, for example, an indication of an average scanning frequency of the first node. For example, node4 130 may send a beacon including an information element as discussed below with regard to FIG. 5 to node2 124, including an indication of the average scanning frequency of node4 130. Nodes receiving the information element may then determine, for example, whether the scanning frequency matches the receiving node's scanning frequency.

For example, the information element may include a scanning counter field which may include, for example, a counter value that may indicate a time period or a number of superframes since a last scanning operation or a time period or a number of superframes before a next scanning operation at the scanning node. As another example, the information element may include a scanning zone field which may include, for example, an indication of one or more portions of a superframe scanned by the first node, as discussed below with regard to FIG. 6. For example, node3 126 may share the scanning operation with node4 130, and the scanning zone may indicate, for example, which portion of a superframe is scanned by node4 130. Alternatively, the scanning zone field may indicate, for example, which subgroups or portions of a group of superframes are scanned by node4 130.

According to an example embodiment, a response message may be sent indicating that the first node is configured to perform the scanning operation on the wireless medium in substitution of scanning the wireless medium at one of the other nodes, in response to receiving a request message (214). For example, the response message may indicate an average scanning frequency associated with the first node or a scanning counter, as discussed below with regard to FIG. 8. For example, node4 130 may send the response message indicating the scanning frequency, for example, to node2 124, so that node2 124 may be informed that a request for scanning has been accepted by node4 130, and node2 124 may be informed of the average frequency of the scanning operation of node4 130.

According to an example embodiment, a scanning indication message may be sent including an average scanning frequency of the first node from the first node to the one or more other nodes in the wireless network (216). For example, the scanning indication message may include the average scanning frequency of the first node and a counter value that indicates a time period or a number of superframes since a last scanning operation or a time period or a number of superframes before a next scanning operation at the first node from the first node in the wireless network to the one or more other nodes in the wireless network, as discussed below with regard to FIG. 9.

According to an example embodiment, the wireless medium may be scanned to obtain scanning results for the one or more other nodes (220).

According to an example embodiment, the scanning results may be sent to the one or more other nodes (230). According to an example embodiment, a beacon including a scanning result information element may be sent to the one or more other nodes (232). For example, the scanning result information element may include scanning information associated with one or more devices associated with an alien beacon group that is different from a first node beacon group that includes the first node and the one or more other nodes, as discussed below with regard to FIG. 10. For example, the scanning result information element may be sent from the first node4 130 to the non-scanning node2 124 informing node2 124 of the BPST of an alien beacon group. Thus, node2

124 may make decisions regarding the alien beacon group, for example, whether node2 124 may join the alien beacon group and leave the current beacon group.

According to an example embodiment, a distributed reservation protocol (DRP) message may be sent indicating an alien reservation type to the one or more other nodes (234).

According to an example embodiment, a request message may be received at the first node indicating a request from one of the other nodes to perform the scanning operation (240). For example, the request message may include an indication of a scanning frequency associated with the one of the other nodes (242). For example, the request message may include a counter value that indicates a time period or a number of superframes since a last scanning operation or a time period or a number of superframes before a next scanning operation at the first node (244), as discussed below with regard to FIG. 7. For example, node4 130 may receive the request message and may determine whether the scanning frequency matches the scanning frequency of node4 130. Node4 130 may make a determination whether to accept the request based on the information included in the request message, and on other information such as beacon information and distance calculations or link quality calculations.

Figure 3:
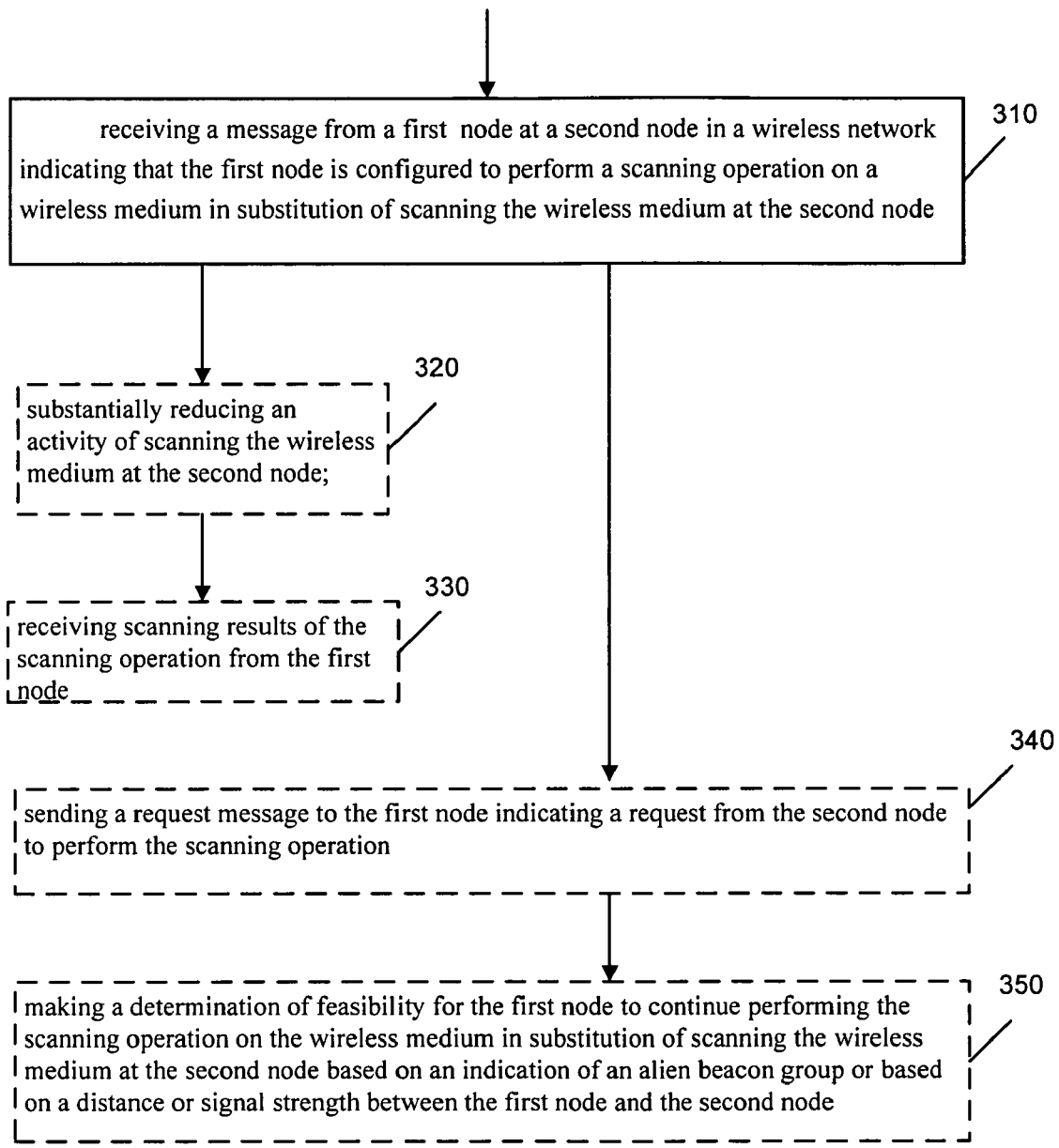
FIG. 3 is a flow chart illustrating operation of determining a node to perform a scanning operation for a node of a wireless network according to an example embodiment.

FIG. 3 is a flow chart illustrating operation of determining a first node to perform a scanning operation for a second node of a wireless network according to an example embodiment. At 310, a message may be received from a first node at a second node in a wireless network indicating that the first node is configured to perform a scanning operation on a wireless medium in substitution of scanning the wireless medium at the second node.

According to an example embodiment, an activity of scanning the wireless medium at the second node may be substantially reduced (320). For example, node2 124 may receive the message from node4 130, and node2 124 may substantially reduce its activity of scanning the wireless medium, substituting scanning operations of node4 130 for the activity of scanning at node2 124 which is reduced.

According to an example embodiment, scanning results of the scanning operation from the first node may be received, for example, at the second node (330). For example, results of scanning at node4 130 may be received at node2 124.

According to an example embodiment, a request message may be sent to the first node indicating a request from the second node to perform the scanning operation (340). For example, node2 124 may send a request message to node4 130 requesting that node4 130 perform scanning operations on a wireless medium in substitution of scanning the wireless medium at node2 124.

According to an example embodiment, a determination may be made of feasibility for the first node to continue performing the scanning operation on the wireless medium in substitution of scanning the wireless medium at the second node based on an indication of an alien beacon group or based on a distance or signal strength between the first node and the second node (350). For example, a distance or signal strength between node4 130 and node2 124 may be measured to determine a feasibility for node4 130 to continue performing the scanning operation for node2 124.

According to an example embodiment, a determination may be made of feasibility for the first node to perform the scanning operation on the wireless medium in substitution of scanning the wireless medium at the second node based on an indication of an alien beacon group or based on a determination of a power source of the first node. For example, a determination may be made of feasibility for the first node4 130 to perform the scanning operation on the wireless medium in substitution of scanning the wireless medium at the second node2 124 based on an indication of an alien beacon group or based on a determination of a power source of the first node, such as a mains or an AC power source for node4 130.

Thus, for example, a first node may significantly reduce the power consumption of a second node by performing scanning operation of the wireless medium in substitution of scanning the wireless medium at the second node.

Figure 4A:
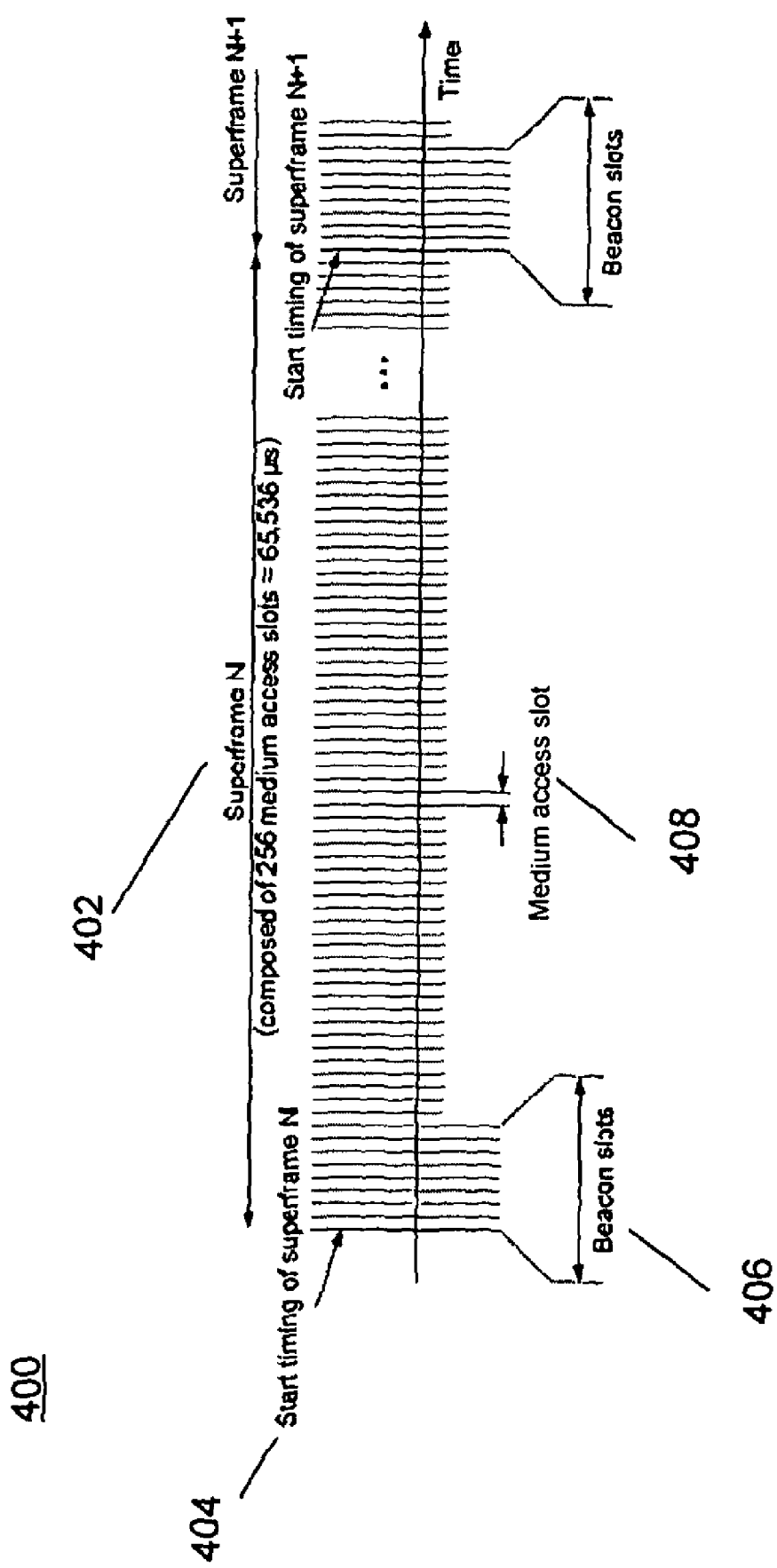
FIGS. 4a-4b is a diagram illustrating operation of transmission of superframes on a medium in a wireless network according to an example embodiment.
Figure 4B:
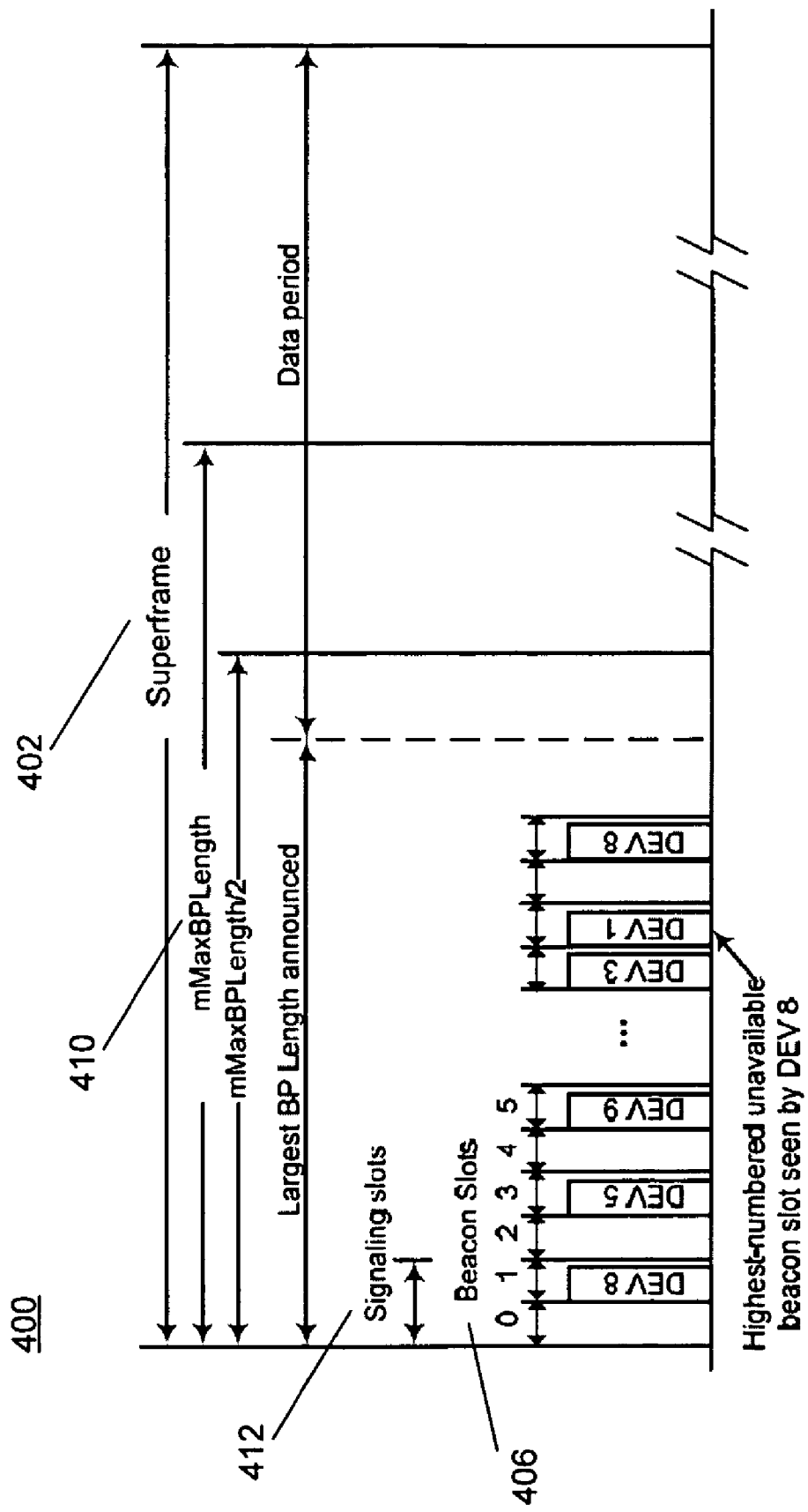

In an example WiMedia network, a basic timing structure for frame exchange may include a superframe. FIGS. 4a-4b depict operations of transmission of superframes on a medium in a wireless network according to an example embodiment.

For example, a duration of an example superframe N 402 may be specified as mSuperframeLength. The superframe N 402 may include a start timing 404 which may be referred to as a beacon period start time (BPST).

The superframe may include multiple medium access slots (MASs) 408, wherein each MAS duration may have a length of mMASLength. In the example of FIG. 4a, the superframe N 402 is shown as including of 256 medium access slots (MASs) 408, although any desired number of MASs may be included in a superframe generally.

Each superframe may start with a beacon period (BP), which may extend over one or more contiguous MASs, which may be referred to as beacon slots 406. The start of the first MAS in the BP, and the superframe, may thus be the beacon period start time (BPST).

According to an example embodiment, each superframe 402 may start with a BP, which may include a maximum length of mMaxBPLength beacon slots 410. The first mSignalSlotCount beacon slots of a BP may be referred to as signaling slots 412 and may be used to extend the BP length of neighbors. An active mode device may, for example, transmit a beacon in the BP and listen for neighbor's beacons in all beacon slots specified by its BP length in each superframe 402. When transmitting in a beacon slot 406, a device may start transmission of the frame on the medium at the beginning of that beacon slot 406. A device may announce its BP length, for example, measured in beacon slots, in its beacon. The announced BP length may include the device's own beacon slot and all unavailable beacon slots in the BP of the prior superframe. The announced BP length may not include more than mBpExtension beacon slots after the last unavailable beacon slot in the BP of the prior superframe. The announced BP length may not exceed mMaxBPLength 410. According to an example embodiment, power-sensitive devices may not include any beacon slots after the last unavailable beacon slot in their announced BP length.

The BP length reported by a device may vary, as new devices may become members of its extended beacon group, and as the device or other devices in its extended beacon group select a new beacon slot for beacon collision resolution or BP contraction.

According to an example embodiment, before a device transmits any frames, it may scan for beacons for at least one superframe. If the device receives no beacon frame headers during the scan, it may create a new BP and send a beacon in the first beacon slot after the signaling slots. If the device receives one or more beacon headers, but no beacon frames with a valid frame check sequence (FCS) during the scan, the device may scan for an additional superframe.

If the device receives one or more beacons during the scan, it may not create a new BP. Instead, prior to communicating with another device, the device may transmit a beacon in a beacon slot chosen from up to mBPExtension beacon slots located after the highest-numbered unavailable beacon slot it observed in the last superframe and within mMaxBPLength after the BPST. For example, as shown in FIG. 4b, beacon slot 414 may be the highest-numbered unavailable beacon slot observed by DEV 8 in the last superframe.

According to an example embodiment, if a node or device detects a beacon collision, the node or device may select a different beacon slot for its subsequent beacon transmissions, for example, from up to mBPExtension beacon slots located after the highest-numbered unavailable beacon slot it observed in the last superframe and within mMaxBPLength after the BPST. If the beacon slot selected for its beacon transmission is located beyond the BP length of any of its neighbors, for example, the node or device may also transmit the same beacon, except with a Signaling Slot bit set to one, or some other indicator, in a randomly chosen signaling beacon slot in the BP.

According to an example embodiment, due to changes in a propagation environment, mobility, or other effects, devices using two or more unaligned BPSTs may come into range, which may cause overlapping superframes. A received beacon, with a valid header check sequence (HCS) and frame check sequence (FCS), for example, that indicates a BPST that is not aligned with a device's own BPST may be referred to as an alien beacon. For example, a BP defined by the BPST and BP length of an alien beacon may be referred to as an alien BP.

Synchronization problems, for example, may cause a beacon of a fast device to appear to be an alien beacon. Thus, according to an example embodiment, a device may consider a BPST to be aligned with its own if that BPST differs from its own by less than 2×mGuardTime. A device may consider an alien BP to overlap the device's own BP if its BPST falls within the alien BP or if the alien BPST falls within its own BP.

According to an example embodiment, the medium may generally be accessed in one of three ways: 1) during the BP, devices may send only beacon frames; 2) during a reservation, devices participating in the reservation may send frames according to rules associated with a device reservation protocol (DRP), as discussed below; or 3) outside the BP and reservations, devices may send frames using a prioritized contention based access (PCA) technique.

The protocols and facilities of an example embodiment may be supported, for example, by an exchange of information between devices. Information may, for example, be broadcast in beacon frames or may be requested, for example, in Probe commands. For each type of information, an Information Element (IE) may be defined. IEs may be included by a device, for example, in its beacon at any time or may be requested or provided using an example Probe command.

An effective example technique to extend battery life of battery powered devices may enable devices to turn off completely or reduce power for long periods of time, where a period of time may be considered to be long relative to the duration of a superframe.

Examples of power management modes in which a device can operate include an active state and a hibernation state. Devices in active mode may transmit and receive beacons in every superframe. Devices in hibernation mode may hibernate for multiple superframes and may not transmit or receive in those superframes. Additionally, devices may sleep for portions of each superframe in order to save power.

To coordinate with neighbors, a device may, for example, indicate its intention to hibernate by including a Hibernation Mode IE in its beacon. The Hibernation Mode IE may specify the number of superframes in which the device will sleep and will not send or receive beacons or any other frames.

An example embodiment may be based on an assumption that in certain environments, a battery powered device may be positioned in the presence of a mains or an AC powered device. It may be desirable that such a mains or AC powered device may handle the scanning on behalf of battery powered devices, especially if the battery powered devices are located close to the mains or AC powered device.

An example embodiment may be based on a goal of having at least one anchor device even among a group of devices powered only by batteries. Thus, the anchor device may maintain the synchronization in the network, and it may also handle the scanning on behalf of other devices, especially if they are located close to the anchor device. According to an example embodiment, the anchor role may be rotated among the devices to divide the power consumption.

According to an example embodiment, if there are at least two anchor devices that are active at the same time, the anchor devices may distribute the scanning responsibility both as inter-superframe and intra-superframe scanning. For example, a number of superframes may be indicated for each anchor device to scan. Alternatively, for example, each superframe may be split into a first half and a second half for scanning.

According to an example embodiment, a device may stop or at least reduce or decrease a frequency of scanning if the device can determine that another device is taking the responsibility of the scanning and is able to share the scanning results, or results of the scanning. The shared results may then be used by the non-scanning device in substitution of the scanning results the device may obtain from its own scanning if the frequency were not reduced or decreased. The devices may communicate an indication of such a responsibility, for example, by an explicit negotiation, for example, via a request-response technique, or via indication messages, and/ or via an implicit technique.

FIG. 5 is an example format of an example scanning information element 500 that may be included in a beacon according to an example embodiment of an implicit technique. The example scanning information element 500 may include a frequency of scanning operations. According to an example embodiment, the scanning information element 500 may include an octet which indicates an average scanning frequency. For example, a value of 'x' for the octet may indicate a scanning frequency of x/256 superframes. The actual scanning frequency may vary between successive scans so that over a reasonably long period of time, the indicated average scanning frequency is achieved. Thus, each node or device of an example beacon group may send a scanning information element 500 in its beacon to indicate to its neighbors how the node is performing its own scanning. Varying scanning frequency may help, for example, in discovery of devices (e.g., WiNet devices) following certain (e.g., fixed) active periods.

According to an example embodiment, the scanning information element 600 may include a counter which indicates a number of superframes from the latest scan or the number of superframes before the next scan. Additionally, both fields may be included, as shown in FIG. 5. Nodes or devices that receive the scanning information element 500 may thus be informed of the sending node's information regarding its scanning of the medium. The receiving nodes or devices may, for example, then determine whether they may assume or share responsibility of performing scanning operations in substitution of performing scanning activity at the sending node or device, or may determine whether they may rely on the scanning performed by the sending node or device in order to reduce the receiving node's scanning activity.

FIG. 6 depicts an example format of a scanning information element 600 that may be included in an example beacon for sharing scanning between scanning nodes according to an example embodiment according to another implicit technique. Similarly to the scanning information element 500, the scanning information element 600 may include a scanning frequency and a counter field as discussed previously.

Additionally, the scanning information element 600 may include scanning zone information, for example, responsibility distribution information regarding intra-superframe or inter-superframe scanning distributed among two or more nodes or devices. For example, with regard to intra-superframe distributed responsibility, a superframe may be split into two or more portions, and each scanning node or device that shares in the scanning responsibility may indicate its own intended scanning zone of the superframe in the scanning information element 600. For example, a first device may indicate that the first device will be responsible for scanning the first half of the superframe, and a second device may indicate that the second device will be responsible for scanning the second half of the superframe.

For example, with regard to inter-superframe distributed responsibility, a group of superframes may be split into two or more portions, or subgroups, and each scanning node or device that shares in the scanning responsibility may indicate its own intended scanning zone of the group of superframes in the scanning information element 600. For example, a first device may indicate that the first device will be responsible for scanning the first half of the group, and a second device may indicate that the second device will be responsible for scanning the second half of the group. For example, a WiNet specification may include provisions for a numbering scheme for superframes, for example, for a group of 256 superframes, numbered 0 to 255.

Thus, for example, if a device operates in accordance with WiNet, the device may include in its beacon a WiNet Identification information element (IE) that includes an Active Cycle Start Countdown (ACSC) field indicating a current point in the device's current active cycle of 256 superframes. By using such a numbering scheme for the superframes, the first device may indicate that it will be responsible for scanning a first set of superframes, a second device may indicate that it will be responsible for scanning a second set of superframes, etc., via the scanning zone field in the scanning information element 600. The scanning zone information field may also include an indicator (e.g., 1 bit), indicating whether the zone information included in the information element 600 is intended for inter-superframe or intra-superframe distribution of scanning.

FIG. 7 depicts an example format of a scanning request message 700 according to an example embodiment, according to an example explicit negotiation technique. By sending the example scanning request message 700, a device may request another device to assume the periodic scanning responsibility. As shown in FIG. 7, the example scanning request message 700 may include a command frame ID indicating that the message is a scanning request message 700. Although the command frame ID is shown in FIG. 7 as having a length of 1–n octets, the command frame ID may have any length, and may, for example, be included as a portion of a WiMedia MAC data frame header (e.g., as a frame subtype included as a four bit frame control field). The scanning request message 700 may further include a length, a scanning frequency, and a counter field, similarly to the scanning information element 500 and scanning information element 600 discussed previously. As discussed previously, the scanning request message 700 may be sent by a node or device to one or more other nodes or devices in a wireless network to request that the other nodes or devices assume responsibility of scanning the medium, for example, in substitution of a scanning activity by the sending node or device.

FIG. 8 depicts an example format of a scanning response message 800 according to an example embodiment, according to an example explicit negotiation technique. The example scanning response message 800 may be used to inform the requester whether the other device accepted the scanning responsibility or not. As shown in FIG. 8, the format of the scanning response message 800 may be similar to the scanning request message 700, and may include a result field. The result field may include a value, for example, of 0 for failure, 1 for success, etc., depending on whether the other device has agreed to assume scanning responsibilities at the scanning frequency that is specified in either the scanning request message 700 or the scanning response message 800.

According to an example embodiment, an implicit technique, for example, a scanning IE, may be used in combination with explicit negotiation.

FIG. 9 depicts an example format of a scanning indication message 900 according to an example embodiment. Thus, instead of using request-response messages, a scanning node or device assuming the responsibility of the periodic scanning on its own initiative may inform the other devices by using an indication message with relevant information. As shown in FIG. 9, the example scanning indication message 900 may include a command frame ID indicating that the message is a scanning indication message 900. Although the command frame ID is shown in FIG. 9 as having a length of 1–n octets, the command frame ID may have any length, and may, for example, be included as a portion of a WiMedia MAC data frame header (e.g., as a frame subtype included as a four bit frame control field). The scanning indication message 900 may further include a length, a scanning frequency, and a counter field, similarly to the scanning information element 500, scanning information element 600, and scanning request message 700 discussed previously. The scanning indication message 900 may be sent by a scanning node or device to one or more other nodes or devices in a wireless network to inform the other nodes or devices that the scanning node or device is performing scanning of the medium, for example, in accordance with the parameters sent in the scanning indication message 900, and thus the receiving nodes or devices may accordingly use scanning results sent by the scanning node in substitution of activities of performing scanning of the medium at the receiving nodes or devices.

The reliability of the scanning sharing is partly based on the topology: the closer the nodes or devices are the more reliable the scan results made by the scanning neighbor node or device may be for a receiving node or device. Therefore, according to an example embodiment, a distance measurement may be used as justification of reliability for using a shared scan. Also, according to an example embodiment, a determination of a link quality may be used as a justification for relying on a shared scan. The distance measurement may be determined, for example, based on beacons or separately as a short measurement operation. Power consumption of these determinations may be negligible compared to scanning. According to an example embodiment, results of a distance measurement may be compared to a predetermined threshold value, and may be utilized as follows:

| Distance | Operation |
| --- | --- |
| >threshold | Shared scan off |
| <threshold | Shared scan on (no own scans) |

If it is desired to gradually decrease or increase scanning activity of a node or device, multiple threshold values may be used as follows:

| Distance | Operation |
| --- | --- |
| >Threshold1 | Shared scan off |
| Threshold2 < distance < threshold1 | Shared scan on, own scanning activity less decreased |
| Threshold3 < distance < threshold2 | Shared scan on, own scanning activity more decreased |
| <Threshold3 | Shared scan completely on (no own scans) |

The threshold values may be fixed to predetermined distance values or may be determined based on, for example, link quality.

During the shared scan operation time the scanning node or device may perform the scanning operations (e.g., the frequency may be negotiated or standardized) and the other node(s) or device(s) may, for example, hibernate or may participate in beaconing as idle devices or may participate in ongoing active data communications.

FIG. 10 depicts an example format of a scanning result information element 1000 that may be included in an example beacon according to an example embodiment. The scanning node or device may send a report of the latest scanning results in its beacons, which may be listened to even by hibernating nodes or devices from time to time. As shown in FIG. 10, the scanning result information element may include a BPST of an alien group that may be related to the scanning node's own group's BPST, as well as other information. For example, the scanning result information element 1000 may include an indication of a scan that formed the basis for the report included in the scanning result information element 1000.

According to an example embodiment, a more simplified report may be sent by a scanning node or device via a control message, for example, via a device reservation protocol (DRP) reservation of an "alien reservation type", for example, as defined by the WiMedia standard.

Figure 11B:
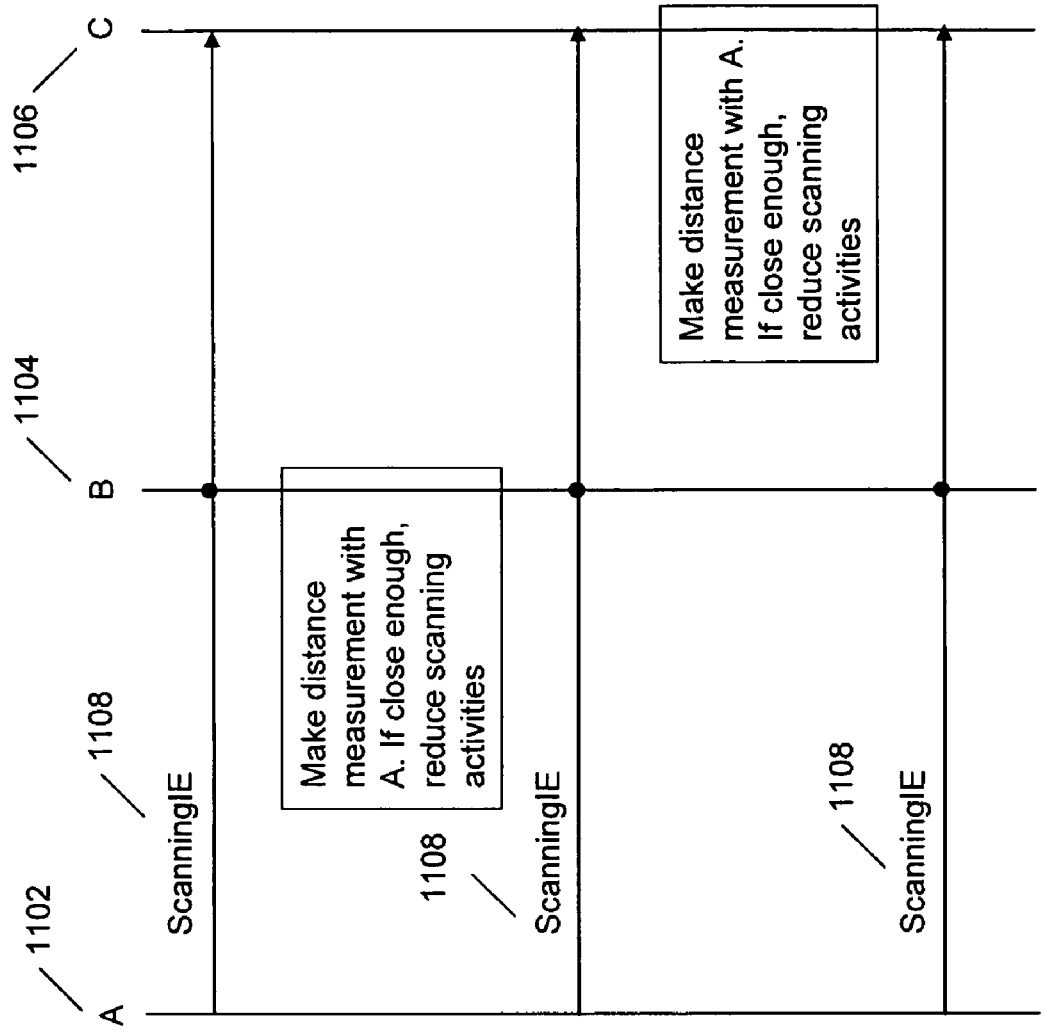
FIG. 11b is a timing diagram illustrating an example transmission of a scanning information element according to an example embodiment.
Figure 11A:
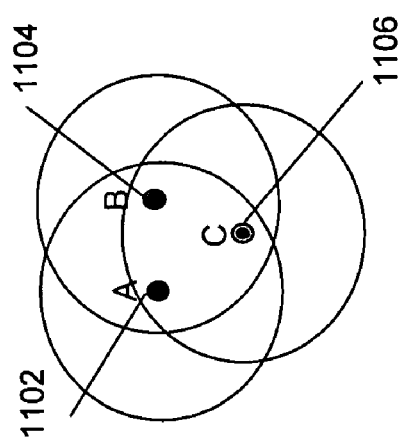
FIG. 11a is a diagram of an example configuration of a beacon group of a wireless network according to an example embodiment.

FIG. 11a is a diagram of an example configuration of a beacon group of a wireless network according to an example embodiment. As shown in FIG. 11a, a node A 1102 may include a mains powered device, for example, an AC powered device, and nodes B 1104 and C 1106 may include battery powered devices. Thus, it may be desirable for the node A 1102 to perform scanning operations for the nodes B 1104 and C 1106, for example, to reduce the power consumption of the battery powered devices.

FIG. 11b is a timing diagram illustrating an example transmission of a scanning information element 1108 according to an example embodiment. As shown in FIG. 11b, the scanning information element 1108 may be broadcast regularly among the nodes A 1102, B 1104, and C 1106. For example, the scanning information element 1108 may be sent in beacons, similarly as discussed previously with regard to the scanning information elements 500 and 600 of FIGS. 5 and 6. As shown in FIG. 11b, each of node B 1104 and node C 1106 may receive the scanning information element 1108 associated with the node A 1102, and may determine that the node A 1102 is scanning in accordance with the receiving node's scanning operation, and may determine a distance measurement between the receiving node (i.e., node B 1104 or node C 1106) and node A 1102. As a result, the receiving node B 1104 and/or the receiving node C 1106 may make a determination to rely on the scanning operation of the node A 1102, and may reduce scanning activities at the respective receiving node.

FIG. 11c is a timing diagram illustrating an example transmission of scanning request and scanning response messages according to an example embodiment. As shown in FIG. 11c, each of node B 1104 and node C 1106 may determine a distance measurement between the respective receiving node and node A 1102. As a result, the receiving node B 1104 and/or the receiving node C 1106 may send a scanning request message 1110 or 1114, respectively, to the node A 1102, for example, in accordance with the scanning request message 700 discussed previously. The node A 1102 may then respond to the request via a scanning response message 1112 or 1116, respectively, for example, in accordance with the scanning response message 800 discussed previously. If the response is successful, the node A 1102 may perform a scanning operation on the wireless medium in substitution of scanning the wireless medium at the node B 1104 and/or the node C 1106, and may send the scanning results to the receiving nodes.

Although the distance measurement and the request-response messages are shown in FIG. 11c as being performed in a particular order, the distance measurements may be performed generally at any time, and the request-response messages may be sent at any time.

According to an example embodiment, if a report in a beacon indicates an alien beacon group, for example, an alien beacon group including one or more nodes or devices found, a non-scanning node or device may exit the shared scan mode to perform its own scanning operation, or to increase its scanning frequency. Alternatively, the non-scanning node or device may continue the reduced-scanning mode, for example, if the new alien group may be expected to relocate to the BPST of the beacon group of the non-scanning node or device.

According to an example embodiment, if a reduced-scanning node or device makes a determination that the distance has increased from the reduced-scanning node or device to the scanning node or device, the reduced-scanning device may exit the shared scan mode or may at least increase the scanning frequency closer to a scanning frequency that is more normal with respect to the reduced-scanning node or device.

According to an example embodiment, if a reduced-scanning node or device makes a determination that the distance from the reduced-scanning node or device to the scanning node or device has increased over multiple shared scanning periods, i.e., the distance has substantially changed, then the reduced-scanning node or device may presume mobility, or some relative movement between nodes or devices. The shared scanning result reliability may thus be lower unless the movement is considered within the shared scanning mode. Thus, for example, the reduced-scanning node or device may either change back to normal scanning mode, or may request a change in the shared scanning frequency.

According to an example embodiment, if a reduced-scanning device makes a determination that the distance from the reduced-scanning node or device to the scanning node or device has decreased over multiple shared scanning periods, i.e., the distance has substantially changed, then the reduced-scanning node or device may presume mobility, or some relative movement between the nodes or devices. In this case, such a determination may mean that the nodes or devices are closer together, and may be approaching each other. In this case, the shared scanning result reliability may become higher, and the scanning frequency may be decreased.

Figure 12:
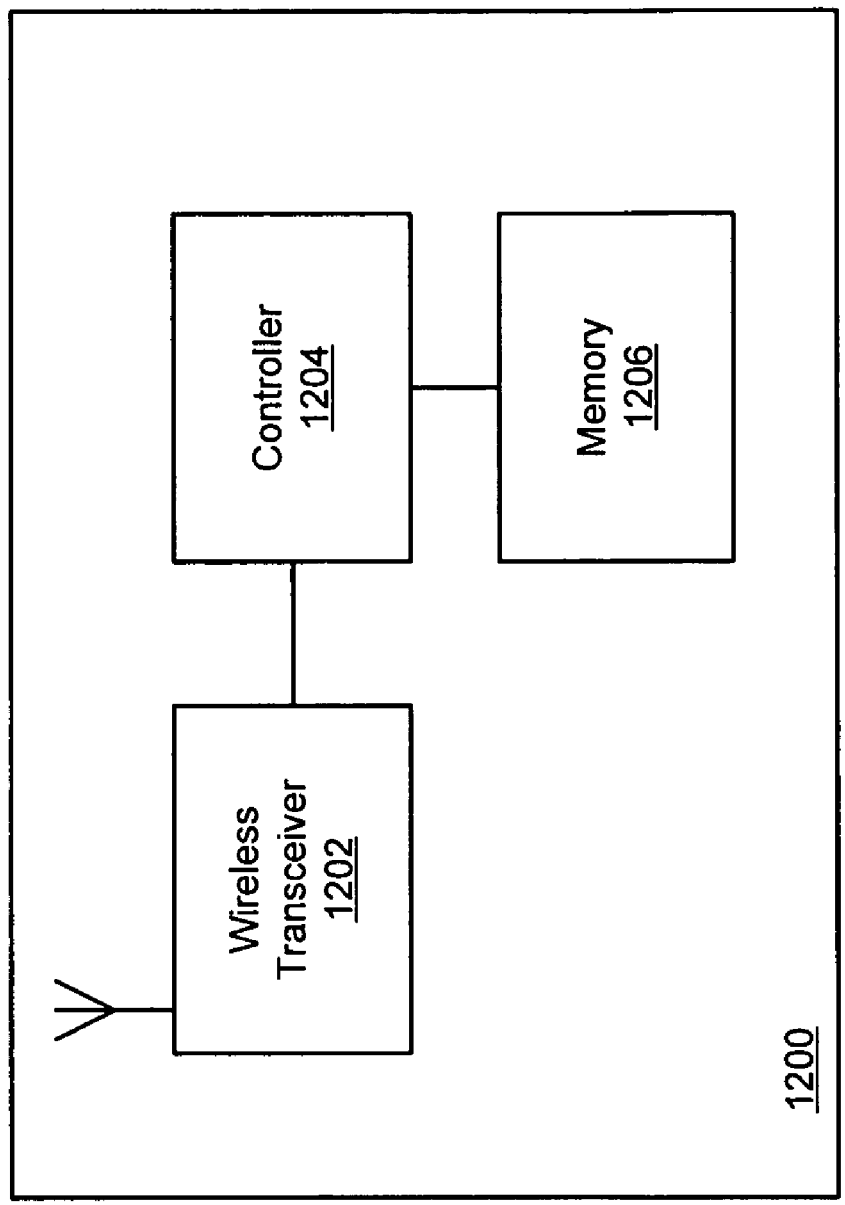
FIG. 12 is a block diagram illustrating an apparatus that may be provided in a wireless station according to an example embodiment.

FIG. 12 is a block diagram illustrating an apparatus 1200 that may be provided in a wireless station according to an example embodiment. The wireless station may include, for example, a wireless transceiver 1202 to transmit and receive signals, a controller 1204 to control operation of the station and execute instructions or software, and a memory 1206 to store data and/or instructions. Controller 1204 may be programmable, and capable of executing software or other instructions stored in memory or on other computer media to perform the various tasks and functions described above. In addition, a storage medium or computer readable medium may be provided that includes stored instructions, that, when executed by a controller or processor, may result in the controller (e.g., the controller 1204) performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or computer readable medium or in a propagated signal, for execution by, or to control the operation of, a data processing apparatus, e.g., a programmable processor or multiple processors, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    sending a message from a first node to one or more other nodes in a wireless network indicating that the first node is configured to perform a scanning operation on a wireless medium in substitution of scanning the wireless medium at the one or more other nodes;
    wherein sending the message indicating that the first node is configured to perform a scanning operation comprises sending an information element, wherein the information element includes:
    a scanning counter field that includes a counter value that indicates a number of superframes since a last scanning operation or a number of superframes before a next scanning operation at the first node.

2. The method of claim 1 wherein:
    the sending the message indicating that the first node is configured to perform a scanning operation comprises sending a beacon including an information element, wherein the information element indicates that the first node is configured to perform the scanning operation on the wireless medium in substitution of scanning the wireless medium at the one or more other nodes.

3. The method of claim 1 wherein: the information element includes a scanning frequency field.

4. The method of claim 3 wherein: the scanning frequency field includes an indication of an average scanning frequency of the first node.

5. The method of claim 1 wherein: the information element includes a scanning zone field.

6. The method of claim 5 wherein: the scanning zone field includes an indication of one or more portions of a superframe scanned by the first node or an indication of one or more subgroups of a group of superframes scanned by the first node.

7. The method of claim 1 further comprising: receiving a request message at the first node indicating a request from one of the one or more other nodes to perform the scanning operation.

8. The method of claim 7 wherein: the receiving the request message comprises receiving the request message including an indication of a scanning frequency associated with the one of the other nodes.

9. The method of claim 7 wherein: the receiving the request message comprises receiving the request message at the first node, the request message including a counter value that indicates a time period or a number of superframes since a last scanning operation or a time period or a number of superframes before a next scanning operation.

10. The method of claim 7 wherein: the sending the message from the first node comprises sending a response message indicating that the first node is configured to perform the scanning operation on the wireless medium in substitution of scanning the wireless medium at the one of the other nodes, in response to the receiving the request message.

11. The method of claim 7 wherein: the sending the message from the first node comprises sending a response message indicating an average scanning frequency associated with the first node or a scanning counter.

12. The method of claim 1 wherein: the sending the message indicating that the first node is configured to perform a scanning operation comprises sending a scanning indication message including an average scanning frequency of the first node from the first node in the wireless network to the one or more other nodes in the wireless network.

13. The method of claim 12 wherein: the sending the message indicating that the first node is configured to perform a scanning operation comprises sending the scanning indication message including the average scanning frequency of the first node and a counter value that indicates a time period or a number of superframes since a last scanning operation or a time period or a number of superframes before a next scanning operation at the first node from the first node in the wireless network to the one or more other nodes in the wireless network.

14. The method of claim 1 further comprising: scanning the wireless medium to obtain scanning results for the one or more other nodes; and sending the scanning results to the one or more other nodes.

15. The method of claim 14 wherein: the sending the scanning results comprises sending a beacon including a scanning result information element to the one or more other nodes.

16. The method of claim 15 wherein: the scanning result information element includes scanning information associated with one or more devices associated with an alien beacon group that is different from a first node beacon group that includes the first node and the one or more other nodes.

17. The method of claim 14 wherein: the sending the scanning results comprises sending a distributed reservation protocol (DRP) message indicating an alien reservation type to the one or more other nodes.

18. The method of claim 1 further comprising: making a determination of feasibility for the first node to perform the scanning operation on the wireless medium in substitution of scanning the wireless medium at the one or more other nodes based on a determination of a power source of the first node.

19. The method of claim 1 further comprising: making a determination of feasibility for the first node to perform the scanning operation on the wireless medium in substitution of scanning the wireless medium at the one or more other nodes based on a distance or signal strength between the first node and the one or more other nodes.

20. The method of claim 1 further comprising: making a determination of feasibility for the first node to continue performing the scanning operation on the wireless medium in substitution of scanning the wireless medium at the one or more other nodes based on an indication of an alien beacon group.

21. The method of claim 1 wherein: the wireless network includes a distributed wireless network, wherein control of the wireless network is distributed among the first node and the one or more other nodes.

22. An apparatus for wireless communications, the apparatus comprising:
a controller;
a memory coupled to the controller; and
a wireless transceiver coupled to the controller; the apparatus adapted to:
send a message via the wireless transceiver to indicate that the apparatus is configured to perform a scanning operation on a wireless medium in substitution of scanning the wireless medium at any of one or more devices receiving the message;
wherein the message includes an information element; and
wherein the information element includes:
a scanning zone field that includes an indication of one or more portions of a plurality of portions of a superframe scanned by the apparatus or an indication of one or more apparatus subgroups of a plurality of groups of a superframe scanned by the apparatus.

23. The apparatus of claim 22 wherein:
the message includes a beacon including an information element, wherein the information element indicates that the apparatus is configured to perform the scanning operation on the wireless medium in substitution of scanning the wireless medium at the any of one or more devices receiving the message.

24. The apparatus of claim 22 wherein: the information element includes a scanning frequency field.

25. The apparatus of claim 24 wherein: the scanning frequency field includes an indication of an average scanning frequency of the apparatus.

26. The apparatus of claim 22 wherein: the information element includes a scanning counter field.

27. The apparatus of claim 26 wherein: the scanning counter field includes a counter value that indicates a time period or a number of superframes since a last scanning operation or a time period or a number of superframes before a next scanning operation at the apparatus.

28. The apparatus of claim 22 further adapted to: receive a request message indicating a request from one of the any of one or more devices receiving the message to perform the scanning operation.

29. The apparatus of claim 28 wherein: the request message includes an indication of a scanning frequency associated with one of the any of one or more devices.

30. The apparatus of claim 22 further adapted to: scan the wireless medium to obtain scanning results for the any of one or more devices; and send the scanning results to the any of one or more devices.

31. The apparatus of claim 30 wherein: the scanning results comprise a scanning result information element included in a beacon sent to the any of one or more devices.

32. The apparatus of claim 31 wherein: the scanning result information element includes scanning information associated with one or more devices associated with an alien beacon group that is different from a first node beacon group that includes the apparatus and the any of one or more devices receiving the message.

33. The apparatus of claim 30 further adapted to: send the scanning results via a distributed reservation protocol (DRP) message indicating an alien reservation type.

* * * * *